Aug. 4, 1953  C. A. COOK  2,647,596
CLUTCH CONSTRUCTION
Filed Dec. 28, 1951  2 Sheets-Sheet 1

INVENTOR.
CHARLES A. COOK
BY
ATTYS.

Aug. 4, 1953 C. A. COOK 2,647,596
CLUTCH CONSTRUCTION
Filed Dec. 28, 1951 2 Sheets-Sheet 2

INVENTOR.
CHARLES A. COOK
BY
ATTYS.

Patented Aug. 4, 1953

2,647,596

UNITED STATES PATENT OFFICE 2,647,596

CLUTCH CONSTRUCTION

Charles A. Cook, Jackson, Mich., assignor to Clark Equipment Company, Buchanan, Mich., a corporation of Michigan Application December 28, 1951, Serial No. 263,727

2 Claims. (Cl. 192—3.5)

My present invention relates generally to a clutch construction, and, more specifically, is directed to a clutch construction including a main friction disc clutch mechanism embodied in a vehicle for effecting drive between a prime mover and a transmission mechanism, wherein the clutch mechanism may be removed from the vehicle without having first to remove the transmission mechanism.

A clutch construction of the general character to which I refer comprises a clutch or drive shaft journaled, at its forward end, in the flywheel of the prime mover and having a gear at its rear end for driving the gear means of a transmission mechanism disposed in a transmission housing. Concentrically mounted about the clutch shaft and secured to the flywheel is a clutch casing, in which are arranged the various elements of the friction disc clutch mechanism for selectively transmitting torque between the flywheel and the clutch shaft. The clutch casing and clutch shaft are enclosed by a clutch housing, secured at its forward end to the flywheel housing and at its rear end to the transmission housing. The clutch housing is provided with a suitable removable cover at the upper end thereof. In the conventional clutch construction described, when it is desired to replace or repair the clutch mechanism, it is necessary to first remove the transmission from the vehicle before the clutch mechanism can be removed. This entails considerable time and labor, as will be appreciated by those skilled in the art.

It is an object of my present invention to provide a clutch construction wherein the component parts are arranged so as to permit the clutch casing, and clutch mechanism therein, to be removed upwardly through the top of the clutch housing without having to demount the transmission housing from the latter.

It is a further object of my present invention to provide a clutch construction, as noted, wherein the flywheel may be removed upwardly through the top of the clutch housing after the clutch casing has been removed and without having to demount the transmission housing from the clutch housing.

It is another object of my present invention to provide a clutch construction, of the character described, wherein the clutch shaft is arranged so that the latter may be drawn axially rearwardly into the transmission housing to provide for withdrawal of the clutch shaft from its journaled position in the flywheel and from driving engagement with the clutch mechanism within the clutch casing, thus freeing the latter for withdrawal out of the clutch housing.

Now, in order to acquaint those skilled in the art with the manner of constructing and using clutch constructions in accordance with the principles of my present invention, I shall describe, in connection with the accompanying drawings, a preferred embodiment of my invention.

Figure 1:
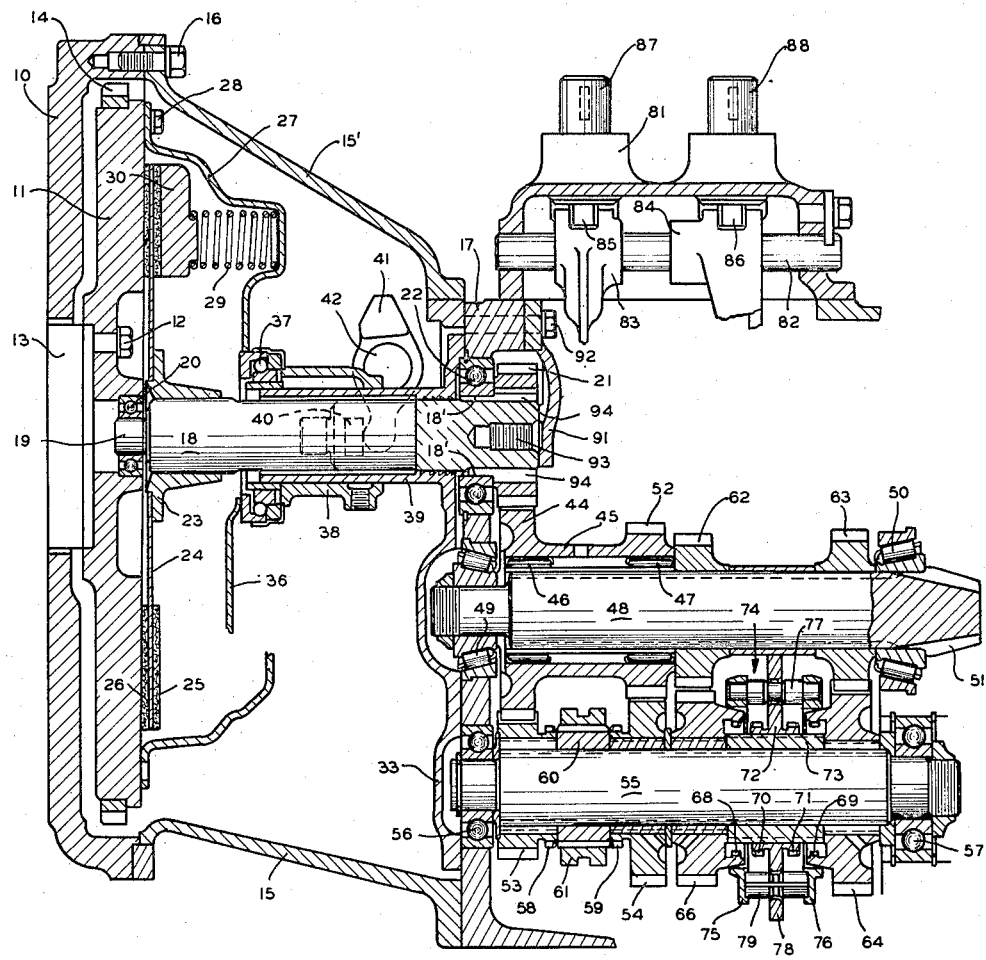
Figure 1 is a vertical longitudinal sectional view of the clutch construction of my present invention and an associated transmission.

Referring now to the drawings, there is indicated by the reference numeral 10 a portion of an engine flywheel housing. Disposed within the flywheel housing 10 is a flywheel 11, which is suitably secured, as, for example, by means of a plurality of circumferentially spaced bolts 12, to the end of an engine crankshaft 13. The crankshaft 13 forms part of a prime mover, as, for example, an internal combustion engine. A starter ring gear 14 is secured to the flywheel 11, at the outer periphery thereof, and the ring gear 14 is adapted to have meshing engagement with the drive pinion of a starter motor (not shown).

A clutch housing 15, together with a clutch housing cover 15', is secured by a plurality of bolts 16 to the rear end of the flywheel housing 10. Suitably secured to the rear end of the clutch housing 15 is the forward end of a transmission housing 17.

A clutch shaft or transmission drive shaft 18 extends through the clutch housing 15 and is aligned coaxially of the axis of the engine crankshaft 13. The clutch shaft 18 at its forward end is formed with a reduced nose portion 19, which is journaled in a ball bearing assembly 20 mounted in a central opening formed in the engine flywheel 11. The shaft 18 at its rear end is formed with an enlarged gear portion 21, which lies within the transmission housing 17 and serves as a transmission main drive gear. Immediately forwardly of the drive gear 21, the clutch shaft 18 has an enlarged rear bearing surface 18' journaled in a ball bearing assembly 22 which is retained in the forward vertical end wall of the transmission housing 17.

Splined on the shaft 18, adjacent the forward end thereof, is a clutch hub 23, to which is secured a radially extending clutch plate or disc 24. Suitable clutch disc facings 25 and 26 are bonded to opposite sides of the clutch plate 24, adjacent the outer periphery thereof. Enclosing the clutch plate 24 is a clutch casing 27, which is secured, by bolts 28, to the rear vertical surface of the engine flywheel 11. Suitable coil springs 29 are arranged between the clutch casing 27 and a clutch pressure plate 30, which normally bears against the clutch disc facing 25, for biasing the clutch disc facing 26 into frictional clutching engagement with the engine flywheel 11.

Conventional clutch release mechanism is mounted within the clutch casing 27 and includes a clutch release lever 36. With the clutch release lever 36 in the position shown in Figure 1, the clutch disc facing 26 is held in frictional engagement with the engine flywheel 11. When disengagement of the clutch disc facing 26 with the engine flywheel 11 is desired, the clutch release lever 36 need only be urged forwardly, whereupon the clutch pressure plate 30 is retracted rearwardly, thereby compressing the clutch springs 29 and releasing the pressure exerted on the clutch disc facing 26.

The means of effecting movement of the clutch release lever 36 includes a clutch release bearing 37, which is suitably retained on a clutch release bearing sleeve 38. The clutch release bearing sleeve 38 is mounted for sliding movement on a tubular extension 39, which extends inwardly of and is formed integrally with a cover member 33 suitably secured to the forward vertical wall of the transmission housing 17. The tubular extension 39 is arranged concentrically about the clutch or transmission drive shaft 18. The clutch release bearing sleeve 38 is formed with bosses 40, which are engaged by the extending legs of a clutch release fork or yoke 51 mounted for pivotal movement on a shaft 42.

The operation of the clutch release mechanism is substantially as follows. When it is desired to effect disengagement of the clutch disc facing 26 with the engine flywheel 11, the clutch release fork 41 is rotated clockwise, as viewed in Figure 1, which causes the clutch release bearing sleeve 38 and the clutch release bearing 37 to move to the left. The inner end of the clutch release lever 36 is thereupon urged to the left, as viewed in Figure 1, which, as described hereinbefore, effects movement of the clutch pressure plate 30 to the right, causing disengagement of the clutch disc facing 26 from the engine flywheel 11. Since the clutch release mechanism is of known and conventional construction, it is believed that the foregoing description thereof is sufficient for purposes of the present disclosure.

I shall now describe the transmission gear means which is embodied within the transmission housing 17. The transmission main drive gear 21 has meshing engagement with the gear portion 44 of a compound gear member 45, which is journaled on needle bearing assemblies 46 and 47 arranged about the outer periphery of a transmission output shaft 48 at the forward end thereof. The output shaft 48, at its forward end, is journaled in a tapered roller bearing assembly 49 retained in the forward end wall of the transmission housing 17, and the shaft 48 at its rear end is journaled in a tapered roller bearing assembly 50 retained in the rear end wall of the transmission housing 17. Formed integrally with the output shaft 48, at the rear end thereof, outwardly of the transmission housing 17, is a bevel pinion portion 51. The bevel pinion portion 51 is adapted to have meshing engagement with a bevel ring gear (not shown), which may, for example, be associated with the differential mechanism of a drive axle.

The compound gear member 45 is also formed with a gear portion 52, and the gear portions 44 and 52 of the compound gear member 45 have meshing engagement, respectively, with axially spaced gears 53 and 54, which are journaled on bearing sleeves mounted on a countershaft 55. The countershaft 55 is shown revolved out of its normal position in Figure 1 for the sake of clarity. The axis of the shaft 55, as shown in Figure 2, actually lies between horizontal planes passing through the axes of the clutch shaft 18 and the output shaft 48 at one side of a vertical plane passing through the axes of the shafts 18 and 48. The forward end of the countershaft 55 is journaled in a ball bearing assembly 56 which is retained in the forward end wall of the transmission housing 17, and the countershaft 55 at its rear end is journaled in a ball bearing assembly 57 which is retained in the rear end wall of the transmission housing 17.

The gears 53 and 54, which are mounted on the countershaft 55, are each formed, respectively, with jaw clutch teeth 58 and 59. A clutch hub 60 is secured to the countershaft 55, intermediate of the gears 53 and 54, and splined on the outer periphery of the clutch hub 60, for axial movement therealong, is a clutch collar member 61. When the clutch collar member 61 is shifted to the left from the position shown in Figure 1, the internal splines of the clutch hub 61 are disposed in engagement with the jaw clutch teeth 58, thereby clutching the gear 53 to the countershaft 55. When the clutch collar member 61 is shifted to the right from the position shown in Figure 1, the internal splines of the clutch hub 61 are disposed in engagement with the jaw clutch teeth 59, thereby clutching the gear 54 to the countershaft 55. Thus, by selectively moving the clutch collar member 61 either to the right or to the left, either one of two drive ratios may be effected between the compound gear member 45 and the countershaft 55.

Fixed to the output shaft 48 are a pair of axially spaced gears 62 and 63. The gear 63 has meshing engagement with a gear 64, which is journaled on a bearing sleeve mounted on the countershaft 55. The gear 62 has meshing engagement with an idler gear, shown diagrammatically at 65 in Figure 2, which idler gear 65, in turn, has meshing engagement with a gear 66 journaled on a bearing sleeve mounted on the countershaft 55. The idler gear 65 is mounted on a lay shaft, indicated diagrammatically at 67 in Figure 2, the axis of which lay shaft 67 lies between vertical planes passing through the axes of the clutch shaft 18 and the countershaft 55, and below a horizontal plane passing through the axis of the output shaft 48.

The gears 66 and 64 are formed, respectively, with jaw clutch teeth 68 and 69, which are adapted to selectively receive the jaw clutch teeth 70 and 71 of a clutch collar member 72 splined on the outer periphery of a clutch hub 73 fixed to the countershaft 55, intermediate of the gears 64 and 66. It is to be observed that when the clutch collar member 72 is shifted to the right, from the position shown in Figure 1, the jaw clutch teeth 71 will be disposed in engagement with the jaw clutch teeth 69, thereby clutching the gear 64 to the countershaft 55. Likewise, when the clutch collar member 72 is shifted to the left, from the position shown in Figure 1, the jaw clutch teeth 70 will be disposed in engagement with the jaw clutch teeth 68, thereby clutching the gear 66 to the countershaft 55. When the gear 64 is clutched to the countershaft 55, a forward drive ratio is provided between the countershaft 55 and the output shaft 48, and when the gear 66 is clutched to the countershaft 55, reverse drive is effected between the countershaft 55 and the output shaft 48. The clutch collar member 72 has associated therewith a synchronizer assembly, indicated generally by the reference numeral 74, which forms the subject matter of the copending application of Leo A. Bixby, Serial No. 175,365, filed July 22, 1950. The synchronizer assembly 74 comprises a pair of synchronizer cone assemblies 75 and 76, spaced axially by circumferentially spaced pins 77 which extend through the radial flange 78 of the clutch collar member 72. Extending through the flange 78 and mounted at their ends within the synchronizer cone assemblies 75 and 76 are circumferentially spaced split pin assemblies 79. The pins 77 and 79 form blocker means with the flange 78 for preventing axial movement of the clutch collar member 72, out of a neutral position, when the countershaft 55 and the gear to be clutched thereto are rotating asynchronously. Since the synchronizer assembly 74 forms no part of my present invention, it is believed that a detailed description of the construction and operation thereof is unnecessary for purposes of the present disclosure.

The above described transmission provides two speeds forward and two speeds reverse. That is, by selectively clutching either the gear 53 or the gear 54 to the countershaft 55, the latter is driven in either one of two drive ratios, and by selectively clutching either the gear 64 or the gear 66 to the countershaft 55, the output shaft 48 is driven in either a forward or reverse direction in the preselected drive ratio.

An opening is formed in the top portion of the transmission housing 17, and a control cover assembly, indicated generally at 81, is provided for closing the same. Mounted within the control cover assembly 81 is a shift rail 82 which provides support for a pair of shiftable forks 83 and 84, the fork 83 being associated with the clutch collar member 61 and the fork 84 being associated with the clutch collar member 72. Axial movement of the forks 83 and 84 is effected, respectively, by means of crank arms 85 and 86, which are secured to the lower ends of vertically extending shafts 87 and 88. The shafts 87 and 88 may be rotated in any suitable manner.

Figure 2:
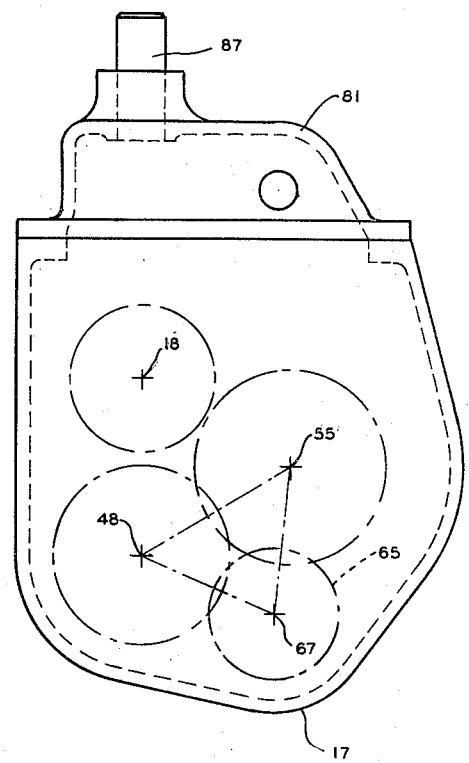
Figure 2 is a generally diagrammatic elevational view showing the geometric arrangement of the shafts of the clutch construction and the transmission of Figure 1.

The clutch shaft 18 is maintained in the position shown in Figure 1 by means of a bracket 91, which is removably secured to the forward wall of the transmission housing 17 by means of a bolt 92. It is to be observed that a tapped opening 93 is formed in the rear end of the clutch shaft 18, centrally thereof. In addition, openings 94, which lie parallel to the axis of the clutch shaft 18, are formed in the gear portion 21. The purpose of the openings 93 and 94 will be fully described hereinafter.

Figure 3:
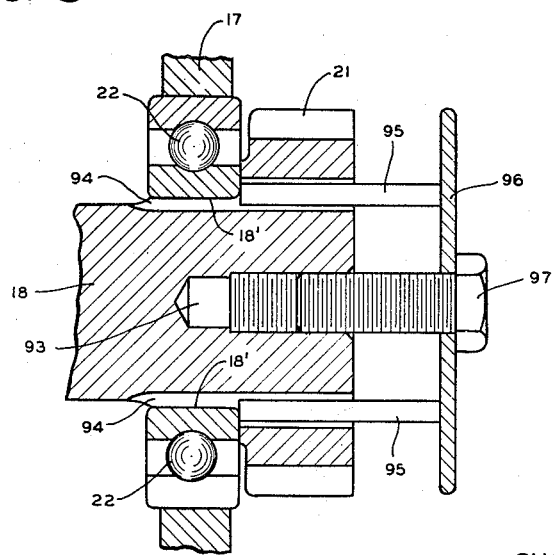
Figure 3 is an enlarged sectional view of a portion of the clutch construction and transmission of Figure 1.

When it is desired to remove the clutch casing 27 and the clutch elements therein, the clutch housing cover 15' is first removed. Then, the control cover assembly 81 is removed from the upper portion of the transmission housing 17, and, finally, the bolt 92 is unthreaded and the transmission drive gear bracket 91 removed. As shown in Figure 3, a pair of pin members 95 are then disposed in the openings 94 in the gear 21, and a washer 96 is placed across the outer ends of the pin members 95. A suitable screw or bolt 97 is disposed through a central opening in the washer 96, and the screw 97 is threaded into the tapped opening 93 formed in the rear end of the clutch shaft 18. It will be readily appreciated by those skilled in the art that, as the screw 97 is threaded into the opening 93, the inner ends of the pin members 95 will bear against the inner race of the ball bearing assembly 22 and the clutch shaft 18 will be drawn rearwardly. The bolt 97 is threaded into the opening 93 until the rear bearing surface 18' and the nose portion 19 of the clutch shaft 18 are withdrawn, respectively, from the ball bearing assemblies 22 and 20. The clutch shaft 18 is then manually drawn into the transmission housing 17 until the forward end of the clutch shaft 18 is withdrawn from the confines of the clutch hub 23.

The bolts 28, securing the clutch casing 27 to the engine flywheel 11, are then removed, after which the clutch casing 27, the clutch plate 24, and the clutch release mechanism, including the clutch release lever 36, may be removed upwardly through the opening in the top of the clutch housing 15. It is to be noted that in removing the main friction disc clutch as described above, it is unnecessary to demount the transmission housing 17 secured to the rear end of the clutch housing 15. It is also unnecessary to remove the clutch release fork 41, the clutch release bearing sleeve 38, or the clutch release bearing 37.

It is to be additionally noted that after the main friction disc clutch casing 27 has been removed, the engine flywheel 11 may, after the bolts 12 have been unthreaded, be removed upwardly through the opening in the top of the clutch housing 15.

Now, while I have shown and described what I believe to be a preferred embodiment of my present invention, it will be understood that various rearrangements and modifications may be made therein without departing from the spirit and scope of my present invention.

I claim:

1. For use with drive means comprising, a flywheel, a flywheel housing, a clutch housing secured to the flywheel housing, the clutch housing having an opening at the upper end thereof, a transmission housing secured to the clutch housing, a drive shaft extending through the clutch housing, means journaling the drive shaft at one end in the flywheel and at the other end thereof in the transmission housing, the drive shaft having an enlarged gear portion lying within the transmission housing, a clutch mechanism within the clutch housing for selectively effecting a driving connection between the flywheel and the drive shaft, openings formed in the enlarged gear portion, a central tapped opening formed in the drive shaft, the combination of means for withdrawing the drive shaft from its journaled positions comprising pin members disposed through the openings in the enlarged gear portion in engagement with the adjacent journaling means, a washer disposed across the projecting ends of said pin members, a bolt disposed through said washer adapted when threaded into the tapped opening in the drive shaft to pull the drive shaft from its journaled positions, and the drive shaft when withdrawn from its journaled positions being selectively manually movable axially within the transmission housing to provide for the withdrawal of the drive shaft from driving engagement with the clutch mechanism thus freeing the latter for withdrawal from the clutch housing without requiring the transmission housing to be demounted from the clutch housing.

2. For use with drive means comprising, a flywheel, a flywheel housing, a clutch housing secured to the flywheel housing, the clutch housing having an opening at the upper end thereof, a transmission housing secured to the clutch housing, a drive shaft extending through the clutch housing, means journaling the drive shaft at one end in the flywheel and at the other end thereof in the transmission housing, the drive shaft having an enlarged gear portion lying within the transmission housing, a countershaft journaled within the transmission housing, an output shaft journaled within the transmission housing, gear means between the gear portion, the countershaft and the output shaft, a clutch mechanism within the clutch housing for selectively effecting a driving connection between the flywheel and the drive shaft, openings formed in the enlarged gear portion, a central tapped opening formed in the drive shaft, the combination of means for withdrawing the drive shaft from its journaled positions comprising pin members disposed through the openings in the enlarged gear portion in engagement with the adjacent journaling means, a washer disposed across the projecting ends of said pin members, a bolt disposed through said washer adapted when threaded into the tapped opening in the drive shaft to pull the drive shaft from its journaled positions, and the countershaft and output shaft being arranged out of coincidence of the drive shaft so that after the latter has been withdrawn from its journaled positions it may be moved selectively axially within the transmission housing to provide for the withdrawal of the drive shaft from driving engagement with the clutch mechanism thus freeing the latter for withdrawal from the clutch housing without requiring the transmission housing to be demounted from the clutch housing.

CHARLES A. COOK.

References Cited in the file of this patent

UNITED STATES PATENTS

| Number | Name | Date |
|---|---|---|
| 2,188,403 | Frisby | Jan. 30, 1940 |
| 2,398,164 | Spangler et al. | Apr. 9, 1946 |
| 2,446,854 | Schroeder | Aug. 10, 1948 |